United States Patent [19]

Christ et al.

[11] Patent Number: 5,567,797
[45] Date of Patent: Oct. 22, 1996

[54] POLYAMIDE COMPOSITION AND PROCESS FOR ITS PRODUCTION

[75] Inventors: Hubert Christ, Golzheim-Merzenich; Wolfgang Schneider, Stommeln, both of Germany

[73] Assignee: A. Schulman, Inc., Akron, Ohio

[21] Appl. No.: 374,693

[22] PCT Filed: Jun. 22, 1993

[86] PCT No.: PCT/EP93/01580

§ 371 Date: Feb. 27, 1995

§ 102(e) Date: Feb. 27, 1995

[87] PCT Pub. No.: WO94/02548

PCT Pub. Date: Feb. 3, 1994

[30] Foreign Application Priority Data

Jul. 25, 1992 [DE] Germany ............... 42 24 668.7
Feb. 1, 1993 [DE] Germany ............... 43 02 703.2

[51] Int. Cl.$^6$ .................. C08G 8/04; C08G 4/00; C08L 77/00
[52] U.S. Cl. ............... 528/310; 528/45; 528/52; 528/125; 528/126; 528/129; 528/137; 528/142; 528/144; 528/162; 528/322; 524/600; 524/607
[58] Field of Search .................. 528/45, 52, 125, 528/126, 129, 142, 144, 162, 310, 322; 524/600, 607

[56] References Cited

U.S. PATENT DOCUMENTS 2,312,966  3/1943  Hanford ................ 260/78
2,512,606  6/1950  Bolton ................ 260/78

Primary Examiner—James J. Seidleck
Assistant Examiner—P. Hampton-Hightower
Attorney, Agent, or Firm—The Firm of Gordon W. Hueschen

[57] ABSTRACT

The object of the present invention is a polyamide composition containing, in reference to the polyamide composition 0.1 to 1 wt. % terephthaldialdehyde and/or its acetals of $C_1$—$C_4$ alcohols and optionally 3 to 30 wt. % melamine and/or melamine cyanurate as well as a process for the production of the polyamide, a process to increase the shock resistance, notched impact resistance and viscosity of flameproof, halogen-free polyamides, and a process to increase the mass of such polyamides.

10 Claims, No Drawings

POLYAMIDE COMPOSITION AND PROCESS FOR ITS PRODUCTION

BACKGROUND OF THE INVENTION

1. Field of the Invention

The subject matter of the invention is a polyamide mass or composition, a process to produce the same and a process to increase the shock resistance, notched impact strength and viscosity of flameproof, halogen-free polyamides. An additional subject matter of the invention is a process to increase the mass of polyamides.

2. Prior Art

In recent times flameproof, halogen-free polyamides are becoming increasingly more important. Therein exist a particular interest for light-colored polyamides for application in the electrical branch. According to EP 0 019 768 it is known that polyamides are flame proofed by adding red phosphorus in combination with melamine cyanurate. According to EP 0 122 693 the application of a halogen-containing flameproofing agent in combination with melamine cyanurate is known.

DE-A 27 40 092 describes a polyamide resinous mass containing 21 wt. % melamine cyanurate flameproofing agent which is added to the polyamide resinous mass to prevent leaching and scaling. This addition effects a satisfactory flame resistance character and leads to a suitabiliy of the polyamide resinous mass for the production of molded objects. Furthermore the so-produced polyamide resinous mass does not tend to undergo either flattening or leaching. Under the term "scaling" the sublimation of the melamine added during the formation of the polyamide mass is to be understood; the sublimed melamine separates from the mold. This results in an undesired flaking or spotting of the molded object during aging of the same. Thereby melamine is washed out of the surface of the molded object. This phenomenon is termed "leaching". The appearance of the so-obtained molded object with respect to the formation of spots is not satisfactory.

DE-C2 32 08 486 also describes a flameproof polyamide mass treated with the reaction product of cyanuric acid with finely divided melamine.

The disadvantage of the existing state of the art is that by flameproofing polyamides with the help of melamine cyanurate, the shock resistance, notched impact strength and viscosity of the polyamide are lowered. In example 5 and Table 1 of DE C2 32 08 486 a flameproof polyamide 66 is described containing 4 wt. % melamine and 6 wt. % melamine cyanurate (1:1). According to Table 3 in example 13 of the printed publication it is to be understood that the test objects were produced from the polyamide of example 5 and compared to the corresponding non-flameproof test objects prepared from polyamide 66. According to Table 3 it is to be understood that the mechanical values of the flame resistance polyamides over the untreated polyamides are considerably deteriorated, especially the viscosity is lowered (page 7, line 33).

OBJECTS OF THE INVENTION

Thus the technical problem of the invention was to provide a halogen-free, flameproof polyamide mass which in spite of its flame resistivity has excellent properties with respect to shock resistance, notched impact strength and viscosity.

This technical problem is solved by polyamide masses which can be halogen-free and/or flameproof, containing in regard to polyamide mass 0.1 to 1 wt. % terephthaldialdehyde and/or its acetals of $C_1$—$C_4$ alcohols and optionally 3 to 30 wt. % melamine and/or melamine cyanurate in accordance with the invention.

In a particular embodiment 5 to 25 wt. % melamine and/or melamine cyanurate and 0.1 to 0.6 wt. % terephthaldialdehyde and/or its acetals of $C_1$—$C_4$ alcohols are incorporated.

In a particular embodiment the polyamide masses can contain additionally talc. Furthermore additional coloring agents, fillers, strengthening agents, stabiliziers and plasticizers can be contained.

An additional object of the invention is the process for the preparation of the polyamide mass, by mixing the components with the polyamide mass, thereafter melting and optionally extruding. The additives in accordance with the invention lead to an increase in the shock resistance, notched impact strength and viscosity while retaining the flame resistance character of halogen-free polyamides.

The effect on the mechanical properties of the polyamides in accordance with the invention obtained through the addition of terephthaldialdehyde or its acetals to melamine cyanurate was surprising, because the expert could have expected that melamine cyanurate would completely react with the active groups of the terephthaldialdehyde, and because of this, completely unable to change the properties of the polyamide. Instead through the addition of terephthaldialdehyde and/or its acetals of $C_1$—$C_4$ alcohols, the polyamide obtains a significantly improvement in its mechanical properties, specifically an increased shock resistance, an increased notched impact strength and an increased viscosity with either equal or better flame resistivity.

The polyamide molded masses in accordance with the invention are suitable for the production of molded objects for technical fields, especially for the electrical branch. They are especially advantageous for applications where they come in contact with parts under current. Examples include plug connections, series terminals or air fuses.

The polyamides contained in the masses are known and include the semicrystalline and amorphous resins having molecular weights (average weight) of at least 5,000 which are typically termed as nylons. Such polyamides are described e.g. in the U.S. Pat. Nos. 2,071,250; 2,071,251; 2,130,523; 2,130,948; 2,241,322; 2,312,966; 2,512,606 and 3,393,210.

The polyamides can be produced e.g. by condensing equal molar amounts of a saturated or an aromatic dicarboxylic acid with 4 to 12 carbon atoms with a diamine having up to 14 carbon atoms, or by condensing ω-amino carboxylic acids or through the polyaddition of lactames.

Examples for polyamides are polyhexamethylene adipinacidic amide (Nylon 66), polyhexamethylene azelainacidic amide (Nylon 69), polyhexamethylene sebacinacidic amide (nylon 610), polyhexamethylene dodecandiacidic amide (Nylon 612). Furthermore also the polyamides obtained through the ring-opening of lactames such polycaprolactame, polylaurinacidic lactame, poly-11-amino-undecanacid and a polyamide from di(p-aminocyclohexyl)methane and dodecandiacid.

It is also possible according to the invention to use polyamides prepared through the cocondensation of two or more of the aforesaid polymers or their components, e.g. copolymers from adipinacids, isophthalacids or terephthalacids and hexamethylene diamine or copolymers from caprolactame, terephthalacid and hexamethene diamine.

Linear polyamides with melting points above 200° C. are preferred.

Preferred polyamide are polyhexamethylene adipinacidic amide, polyhexamethylene sebacinacidic amide and polycaprolactame. The polyamides generally exhibit a relative viscosity from 2.5 to 5, determined in a 1 wt. % solution in 96% sulfuric acid at 23° C., which corresponds to a molecular weight about 15,000 to 45,000. Polyamides with a relative viscosity between 2.5 and 3.5, especially 2.6 to 3.5 are applied preferrably.

In addition polyamides can also be applied which e.g. are accessible through the condensation of 1,4-diaminobutane with adipinacid at higher temperatures (polyamide-4,6). The production process for such polyamides are described in EP-A 0 038 094; EP-A 0 038 582; EP-A 0 039 524.

Surprisingly it was determined that for non-flameproof polyamides a significant increase in the viscosity and therewith the molecular mass can be achieved through the admixing of terephthaldialdehyde and its derivatives.

Thus an additional object of the invention is a process for increasing the molecular mass of polyamide masses through the application of terephthaldialdehyde or its acetals of $C_1$—$C_4$ alcohols.

With the hitherto known syntheses of polyamides, process-determining polymerization grades/molecular weights are achieved, which satisfy commercial demands. Higher molecular weights are e.g. realized by secondary thermal polycondensation in the solid phase.

Further Discussion of the Prior Art

DE-OS 38 31 707 describes a process for accelerated polyamide production during fused polycondensation by applying amino caprolactame and/or lysin components and catalyst additives, an accelerated solid phase secondary polycondensation of catalyst-containing (Co-)polyamides, and polyamides prepared according to the process.

DE-OS 38 31 708 contains a process for the solid phase secondary polycondensation of (Co-)polyamides which contain low amounts of included lysin components together with an approximately equivalent amount of polycarboxylic acid. In a shorter reaction time thermoplastic moldable, slightly branched, aliphatic (Co-)polyamides are obtained with increased melt viscosity and more pronounced structural viscosity. To achieve the corresponding properties however reaction times up to several hours are still necessary. In this second energy intensive process step, the polyamides are thermally stressed over a longer time span.

DE-OS 27 02 306 describes a process for the production of polyamides with high viscosity through the addition of an alkylene carbonate in the polyamide mass present as a melt. Through this a polyamide with high polycondensation grade is obtained.

SUMMARY OF THE INVENTION

Therefore the invention confronts the further task to develop a simple and reliable process for the rapid increase in molecular mass of polyamides in melts which is carried out on a technical scale in a reactor, preferrable in a reaction extruder.

This problem can be surprisingly simply solved by applying terephthaldialdehyde and/or its acetals of $C_1$—$C_4$ alcohols as an additive. This additive is applied in amounts from 0.1 to 1.0 wt. % and thereby leads to excellent results.

The amount of additive added depends on above all how much of an increase in the molecular mass and thus the corresponding viscosity is desired. One mol of terephthaldialdehyde is capable of binding a maximum of two free amino groups. Additives beyond this remain ineffective, unnecessarily increase costs and in some cases can even lead to a degeneration of the other properties of the polyamide. Preferrably the amount of additive is so chosen that less than one half a mol per free amino group is added.

Optionally the individual desired optimal amount can be determined in pre-trials so that on the technical scale a predictable and reproducible improvement in the molecular mass and the viscosity can be targeted.

The process in accordance to the invention is applicable for all types of polyamides, especially polyamide 6, polyamide 6.6, polyamide 11 and 12 as well as polyamide 6.9, 6.10, 6.12 and 6.13.

Of special meaning is the application of the process according to the invention for the recovery of polyamides, because recycling entails a thermal stress which generally leads to a degeneration of the molecular mass and a reduction in viscosity. Recycled polyamides can be, in accordance to the invention, applied for the same or similar purposes in which they were originally used.

The reaction of the polyamides with the additives in accordance with the invention proceeds very quickly, so that the unnecessarily long additional thermal stress during processing can be avoided.

The addition of additives can be typically achieved in solid or melted state or in inert solvent. Inasmuch as low boiling solvents or acetals of lower alcohols are used, they can removed again in the vapor state. Multizone extruders also typically have degasing zones from which such vapors could be removed.

DESCRIPTION OF THE PREFERRED EMBODIMENTS

The following examples should further illustrate these effects according to the invention.

EXAMPLES 1 TO 12

In the examples melamine cyanurate having a 50 mm grain size ($d_{50}$) from the company Chemie Lenz was used. Polyamide 6 with a relative viscosity of $\eta_{rel}$=1.68 (at 25° C. in 98% $H_2SO_4$; 500 mg/100 ml solution) was applied as the base polymer. The polyamide 66 used, had a relative viscosity of 1.64 as measured at 23° C. in 500 mg/100 ml of 96% $H_2SO_4$. In a ZSK-30/Werner/Pfleiderer at 305 U/min and a throughput of 20 kg/h of polyamide 6, melamine cyanurate and terephthaldialdehyde with a melting point of 112°–115° C. were charged (see Table 1).

As combustion test, the combustion test UL-94 (Underwriters Laboratories, Inc.; USA) in a vertical combustion configuration was utilized. The Izod impact strength was measured according to ASTM D-256 in which a 1.3 mm wide test sample with a notch was employed. The Charpy impact strength was measured according to DIN 53 453.

Tables 1 and 3 show the compositions of the polyamides 6 and 66 according to the invention (examples 2 to 6 and 8 to 12). Examples 1 and 7 are comparative examples from the state of the art.

Tables 2 and 4 show the mechanical properties of the polyamides in accordance with the invention.

The results detailed in Tables 2 and 4 illustrate that im comparison to the control examples 1 and 7 while maintaining the flameproof character of the polyamides, a significant increase in notched impact resistance, shock resistance and relative viscosity is achieved.

TABLE 1

The composition of polyamide 6

| example No. | Polymer | Polyamide 6 in weight equivalents (wt. eq.) | Terephthaldialdehyde in. wt. eq. | flameproofing agent Melamine cyanurate in wt. eq. |
|---|---|---|---|---|
| 1 | PA6 according to DE 2740092C3 example 2 | 87.5 | — | 12.6 |
| 2 | | 87.4 | 0.1 | 12.6 |
| 3 | | 91.9 | — | 8 |
| 4 | | 91.8 | 0.1 | 8 |
| 5 | | 91.8 | 0.2 | 8 |

TABLE 2 mechanical properties of polyamide 6

| No. | UL 94 Flameproof effect; thickness of test object in mm | | | Izod Impact strength ASTM D-256 kJ/m² | Charpy Notch impact strength DIN 53 453 kJ/m² | $\eta_{rel}$ Viscosity |
|---|---|---|---|---|---|---|
| | 0.8 | 1.6 | 3.2 | | | |
| 1 | V-0 | V-0 | V-0 | 3.3 | 3.2 | — |
| 2 | V-0 | V-0 | V-0 | 4.2 | 4.0 | 1.77 |
| 3 | V-2 | V-0 | V-0 | 7.6 | 7.3 | 1.72 |
| 4 | V-0 | V-0 | V-0 | 8.2 | 8.0 | 1.81 |
| 5 | V-2 | V-0 | V-0 | 6.7 | 8.9 | 1.83 |

In example 6, two weight equivalents of talc was added to the composition of example 3, according to UL 94 the classification V-0 is reached in a Izod test with 7.8 kJ/m² and in Charpy with 7.7 kJ/m².

TABLE 3

Composition of polyamide 66

| No. | Example Polymer | Polyamide 66 in wt. eq. | Terephthaldialdehyde in wt. eq. | Melamine cyanurate in wt. eq. | Melamine | CaS |
|---|---|---|---|---|---|---|
| 7 | example 5 from DE 208486C2 | 89.7 | — | 6 | 4.0 | 0.3 |
| 8 | | 89.6 | 0.1 | 6 | 4.0 | 0.3 |
| 9 | | 91.8 | 0.2 | 6 | 4.0 | 0.3 |
| 10 | | 92.0 | — | 8 | — | 0.3 |
| 11 | | 91.8 | 0.2 | 8 | — | — |

CaS = calcium stearate.

TABLE 4 mechanical properties of polyamide 66

| No. | UL 94 Flameproof effect; thickness of test object in mm | | | Izod Impact strength ASTM D-256 kJ/m² | Charpy Notch impact strength DIN 53 453 kJ/m² | $\eta_{rel}$ Viscosity |
|---|---|---|---|---|---|---|
| | 0.8 | 1.6 | 3.2 | | | |
| 7 | V-0 | V-0 | V-0 | 2 | 2.3 | — |
| 8 | V-0 | V-0 | V-0 | 4.4 | 5.8 | 1.68 |
| 9 | V-0 | V-0 | V-0 | 4.1 | 6.3 | 1.73 |
| 10 | V-2 | V-0 | V-0 | 5.6 | 5.4 | 1.65 |
| 11 | V-0 | V-0 | V-0 | 6.7 | 5.8 | 1.77 |

In example 12 to the composition of example 11 was added 2 wt. % of talc. According to classification UL V-0 is reached with an notched impact resistance of 5.9 kJ/m² according to DIN 53 453.

EXAMPLES 13 TO 17

Polyamide 6 having a relative solution viscosity of $\eta_{rel}$= 1.79 (500 mg/100 ml concentrated sulfuric acid, 25° C.) was employed as the base polymer. In a ZSK-30/Werner & Pfleiderer extruder 25 kg/h polyamide 6 was melted and the following amounts of terephthaldialdehyde at 300 U/min were charged into the melt. Terephthaldialdehyde has a melting point of 112° to 115° C. The extruded polyamide was newly measured and yielded the values listed in the following Table 5.

TABLE 5

| Trial No. | Polyamide 6 wt. % | Additiv wt. % | $\eta_{rel}$ |
|---|---|---|---|
| 13 | 100 | — | 1.79 |
| 14 | 99.9 | 0.1 | 1.87 |
| 15 | 99.8 | 0.2 | 1.93 |
| 16 | 99.6 | 0.4 | 2.06 |
| 17 | 99.4 | 0.6 | 2.18 |

EXAMPLES 14 TO 18

The following examples should demonstrate the process in accordance with the invention for increasing the molecular mass:

Polyamide 6.6 with a relative solution viscosity $\eta_{rel}$=1.78 (500 mg/100 ml, concentrated sulfuric acid, 25° C.) was applied as the base polymer. The material was treated with terephthaldialdehyde and extruded as described in example 13.

The properties are summarized in the following Table 6:

TABLE 6

| Trial No. | Polyamide 6.6 wt. % | Additiv wt. % | $\eta_{rel}$ |
|---|---|---|---|
| 14 | 100 | — | 1.78 |
| 15 | 99.9 | 0.1 | 1.83 |
| 16 | 99.8 | 0.2 | 1.94 |
| 17 | 99.6 | 0.4 | 2.03 |
| 18 | 99.4 | 0.6 | — |

In trial No. 18 the solution viscosity could not be determined because the polyamide 6.6 could no longer be brought into solution.

EXAMPLES 19 TO 21

In the trials 19 to 21 the base polymer polyamide 6 corresponding to that in trials 13 to 17 was used.

In a ZSK 30/Werner & Pfleiderer, 25 kg/h of polyamide 6 was melted, and at 300 U/min the following additive amounts of terephthaldialdehyde tetramethylacetale having a melting point of 50°–53° C. was charged into the melt. Terephthaldialdehyde tetramethylacetale was prepared according to the procedure reported by Ernst-Schmitz in Chemische Berichte, 1991, 1958. The properties are listed in Table 7.

TABLE 7

| Trial No. | Polyamide 6 wt. % | Additiv wt. % | $\eta_{rel}$ |
|---|---|---|---|
| 13 | 100 | — | 1.79 |
| 19 | 99.9 | 0.1 | 1.83 |
| 20 | 99.8 | 0.2 | 1.89 |
| 21 | 99.5 | 0.5 | 1.99 |

EXAMPLES 22 TO 26

In the trials 22 to 26 the base polymer polyamide 6.6 having a relative solution viscosity of $\eta_{rel}$=1.80 (500 mg/100 ml, concentrated sulfuric acid, 25° C.) was used.

In a ZSK 30/Werner & Pfleiderer, 25 kg/h polyamide 6.6 was melted, and at 300 U/min the following amounts of the terephthaldialdehyde tetramethylacetale additive with a melting point of 50°–53° C. was dosed into the melt. The properties are listed in Table 8.

TABLE 8

| Trial No. | Polyamide 6.6 wt. % | Additiv wt. % | $\eta_{rel}$ |
|---|---|---|---|
| 22 | 100 | — | 1.80 |
| 23 | 99.8 | 0.2 | 1.84 |
| 24 | 99.7 | 0.3 | 1.87 |
| 25 | 99.5 | 0.5 | 1.95 |
| 26 | 99.2 | 0.8 | 2.05 |

The examples demonstrate that through the addition of 0.1 to 1 wt. % of the additive, a significant increase in the viscosity and an increase in the molecular mass is achieved.

We claim:

1. Polyamide composition containing 0.1 to 1 wt. % terephthaldialdehyde and/or an acetal thereof with a $C_1$—$C_4$ alcohol based on the weight of polyamide composition.

2. Polyamide composition according to claim 1 containing 3 to 30 wt. % melamine and/or melamine cyanurate based on the weight of the polyamide composition.

3. Polyamide composition according to claim 1 or 2, additionally containing talc.

4. Polyamide composition according to claim 1 or 2, containing, based on the weight of the polyamide composition, 5 to 25 wt. % melamine and/or melamine cyanurate and 0.1 to 0.6 wt. % terephthaldialdehyde and/or an acetal thereof with a $C_1$—$C_4$ alcohol.

5. Polyamide composition according to claim 1 or 2, containing an additional agent selected from coloring agents, fillers, strengthening agents, stabilizers, or plasticizers.

6. Process for producing a polyamide composition according to claim 1 or 2, wherein the additional components are mixed with the polyamide mass and the admixture subsequently melted and optionally extruded.

7. Process for increasing the shock resistance, notched impact resistance and viscosity of a flameproof, halogen-free polyamide comprising the step of admixing 3 to 30 wt. % melamine and/or melamine cyanurate and 0.1 to 1 wt. % terephthaldialdehyde and/or an acetal thereof with a $C_1$—$C_4$ alcohol into the polyamide.

8. Process according to claim 7, wherein talc is included in the admixture.

9. Process according to claim 7 or 8, wherein 5 to 25 wt. % melamine and/or melamine cyanurate and 0.1 to 0.6 wt. % terephthaldialdehyde and/or an acetal thereof with a $C_1$—$C_4$ alcohol are employed in the admixture.

10. Process to increase the mass of a polyamide through an additive to a polyamide melt, wherein 0.1 to 1 wt. % terephthaldialdehyde and/or an acetal thereof with a $C_1$—$C_4$ alcohol is employed as additive.

* * * * *

UNITED STATES PATENT AND TRADEMARK OFFICE
CERTIFICATE OF CORRECTION

PATENT NO. : 5,567,797
DATED : October 22, 1996
INVENTOR(S) : Hubert Christ and Wolfgang Schneider It is certified that error appears in the above-indentified patent and that said Letters Patent is hereby corrected as shown below:

Abstract [57], line 6: Insert -- composition -- after "polyamide".

Column 7, line 40: Correct the spelling of "Additive".

Column 8, line 26: Delete "mass" after "polyamide".

Signed and Sealed this

Twenty-first Day of January, 1997

*Attest:*

BRUCE LEHMAN

*Attesting Officer*     *Commissioner of Patents and Trademarks*